United States Patent
Cho et al.

(10) Patent No.: US 11,794,720 B2
(45) Date of Patent: Oct. 24, 2023

(54) HYBRID ELECTRIC VEHICLE AND METHOD OF CONTROLLING THE SAME

(71) Applicants: Hyundai Motor Company, Seoul (KR); Kia Motors Corporation, Seoul (KR)

(72) Inventors: Jin Kuk Cho, Gyeonggi-do (KR); Ji Hyun Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 278 days.

(21) Appl. No.: 17/109,556

(22) Filed: Dec. 2, 2020

(65) Prior Publication Data
US 2022/0048495 A1 Feb. 17, 2022

(30) Foreign Application Priority Data
Aug. 11, 2020 (KR) .................. 10-2020-0100694

(51) Int. Cl.
| | |
|---|---|
| *B60W 10/08* | (2006.01) |
| *B60W 20/50* | (2016.01) |
| *B60K 6/387* | (2007.10) |
| *B60K 6/26* | (2007.10) |

(52) U.S. Cl.
CPC .............. *B60W 20/50* (2013.01); *B60K 6/26* (2013.01); *B60K 6/387* (2013.01); *B60K 2006/268* (2013.01); *B60W 2510/06* (2013.01); *B60W 2710/025* (2013.01)

(58) Field of Classification Search
CPC . B60K 2006/268; B60K 6/387; B60W 20/50; B60W 2510/06; B60W 2710/025
See application file for complete search history.

(56) References Cited

U.S. PATENT DOCUMENTS

| 7,336,002 B2* | 2/2008 | Kato ..................... H02J 7/1423 |
| | | 307/10.6 |
| 9,656,666 B2* | 5/2017 | Wang .................. B60W 30/192 |
| 2022/0048495 A1* | 2/2022 | Cho .......................... B60K 6/48 |

* cited by examiner

*Primary Examiner* — Gonzalo Laguarda
(74) *Attorney, Agent, or Firm* — Fox Rothschild LLP

(57) ABSTRACT

A hybrid electric vehicle capable of starting an engine in the event of failure of a DC-DC converter and a method of controlling the hybrid electric vehicle are provided. The hybrid electric vehicle includes a driving motor, an engine, and a first relay that starts a starter. A second relay is disposed between a first power line, connected the starter and a first battery, and second power line, connects a DC-DC converter that converts the power of a second battery and an electric load. A controller selectively adjusts the states of the first relay and the second relay. Upon determining starting of the engine and detecting failure of the DC-DC converter, the controller maintains the on state of the second relay and turns on the first relay to perform cranking of the engine.

11 Claims, 8 Drawing Sheets

FIG. 1
PRIOR ART

- - - - HIGH-VOLTAGE SYSTEM
——— LOW-VOLTAGE SYSTEM

HYBRID ELECTRIC VEHICLE AND METHOD OF CONTROLLING THE SAME

CROSS REFERENCE TO RELATED APPLICATION(S)

This application claims the benefit of Korean Patent Application No. 10-2020-0100694, filed on Aug. 11, 2020, which is hereby incorporated by reference as if fully set forth herein.

BACKGROUND

Field of the Disclosure

The present disclosure relates to a hybrid electric vehicle capable of starting an engine in the event of failure of a direct current-direct current (DC-DC) converter and to a method of controlling the hybrid electric vehicle.

Discussion of the Related Art

Recently, with increased concern about the environment, environmentally friendly vehicles are being actively developed. As representative examples of environmentally friendly vehicles, electric vehicles (EVs) and hybrid electric vehicles (HEVs) have been developed.

In general, a hybrid electric vehicle (HEV) is a vehicle that uses two types of power sources, and the two types of power sources are an engine and a motor. Compared with a vehicle equipped with only an internal combustion engine, the hybrid electric vehicle exhibits improved fuel efficiency, improved power performance, and reduced emissions. Thus, hybrid electric vehicles are recently being actively developed.

Hybrid electric vehicles may operate in one of two driving modes depending on the powertrain that is being driven. One of the two driving modes is an EV mode, in which the hybrid electric vehicle travels using only an electric motor, and the other driving mode is an HEV mode, in which power is generated by driving both an electric motor and an engine. While traveling, the hybrid electric vehicle switches between the two driving modes depending on the traveling conditions. In general, switching between the two driving modes is performed to maximize fuel efficiency and driving performance based on the efficiency characteristics of the powertrain.

To start the engine in a hybrid electric vehicle, it is common to crank the engine through a hybrid starter generator (HSG), which receives power from a main battery (i.e. a high-voltage battery). However, in recent years, a low-voltage (e.g. 12V) starter has been installed instead of an HSG to secure space for an engine compartment and to simplify the structure of the vehicle. This structure will be described with reference to FIG. 1.

Figure 1:
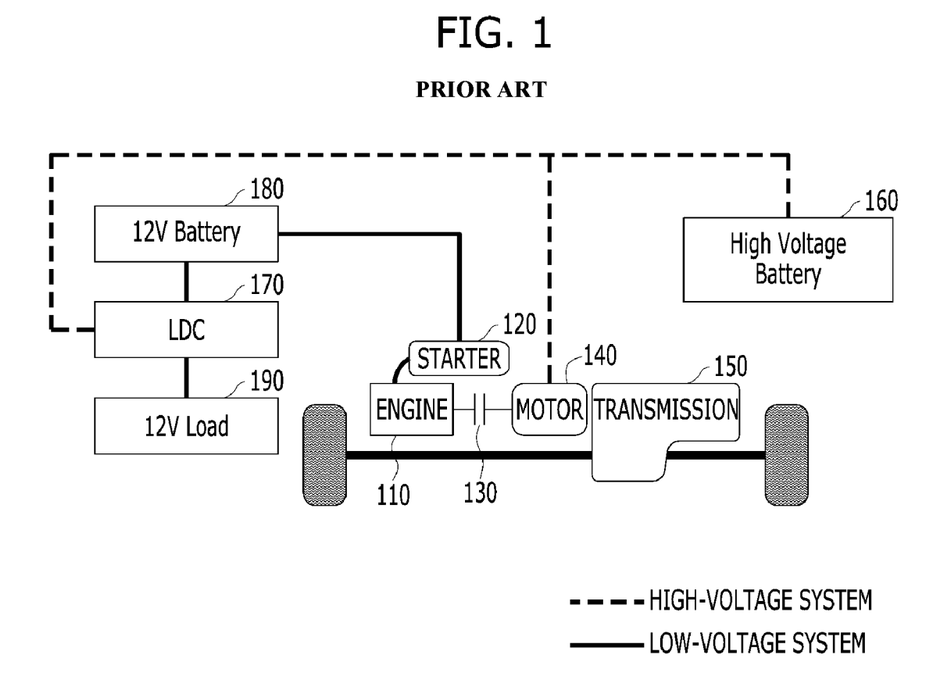
FIG. 1 shows an example of the structure of a hybrid electric vehicle equipped with a general low-voltage starter according to the prior art.

FIG. 1 shows an example of the structure of a hybrid electric vehicle equipped with a general low-voltage starter according to the prior art. FIG. 1 illustrates the structure of the powertrain of a hybrid electric vehicle equipped with a parallel-type or transmission-mounted-electric-drive (TMED)-type hybrid system. Referring to FIG. 1, an electric motor (or a drive motor) 140 and an engine clutch (EC) 130 are disposed between an engine (ICE) 110 and a transmission 150.

In such a vehicle, when a driver engages an accelerator pedal after starting the vehicle, the motor 140 is first driven using electric power from a battery in the state in which the engine clutch 130 is open, and then power from the motor is transmitted to the wheels via the transmission 150 and a final drive (FD) 160 to rotate the wheels (i.e. the EV mode). When greater driving force is required as the vehicle is gradually accelerated, a low-voltage starter 120 may be operated to start the engine 110.

When the rotational speeds of the engine 110 and the motor 140 become equal, the engine clutch 130 is locked, with the result that both the engine 110 and the motor 140, or only the engine 110, drives the vehicle (i.e. transition from the EV mode to the HEV mode). When a predetermined engine OFF condition is satisfied, for example, when the vehicle is decelerated, the engine clutch 130 is opened, and the engine 110 is stopped (i.e. transition from the HEV mode to the EV mode). In addition, when the hybrid electric vehicle is decelerated, the driving force of the wheels is converted into electrical energy, and the battery is charged with the electrical energy, which is referred to as recovery of braking energy or regenerative braking.

The high-voltage battery 160 supplies power to the motor 140, or is charged with energy recovered (i.e. generated) through the motor 140. A low-voltage DC-DC converter (LDC) 170 may decrease the voltage of the power from the high-voltage battery 160 to charge the low-voltage (i.e. 12V) battery 180 or to supply the power to an electric load 190 connected to a low-voltage system.

However, in general, the 12V starter 120 requires a high current of 600 A at the initial stage of engine cranking. At this time, since the 12V starter 120 draws and uses an electric charge from a low-voltage system line, the voltage of the low-voltage system line temporarily decreases during cranking. Accordingly, the supply of power to the electric load 190 connected to the low-voltage system may become temporarily unstable, and thus the controller of the vehicle may temporarily stop operating. In particular, the steering wheel or the brake system may not be capable of rapid operation, thus causing a safety problem. When the LDC 170 fails, the problem may become more serious.

SUMMARY

Accordingly, the present disclosure is directed to a hybrid electric vehicle and a method of controlling the same that substantially obviate one or more problems due to limitations and disadvantages of the related art. An object of the present disclosure is to provide a hybrid electric vehicle enabling stable engine cranking and a method of controlling the hybrid electric vehicle.

Particularly, the present disclosure provides a hybrid electric vehicle enabling stable engine cranking in the event of failure of a DC-DC converter and a method of controlling the hybrid electric vehicle. However, the objects to be accomplished by the exemplary embodiments are not limited to the above-mentioned objects, and other objects not mentioned herein will be clearly understood by those skilled in the art to which the embodiments pertain from the following description.

In order to accomplish the above and other objects, a hybrid electric vehicle equipped with a driving motor and an engine according to an exemplary embodiment of the present disclosure may include a first relay configured to control starting of a starter, a second relay disposed between a first power line, connecting the starter and a first battery, and a second power line, connecting a DC-DC converter configured to convert power of a second battery and an electric load, and a controller configured to selectively adjust the states of the first relay and the second relay. In response to determining starting of the engine and detecting failure of the DC-DC converter, the controller may be configured to maintain the on state of the second relay and turn on the first relay such that cranking of the engine is performed.

A method of controlling a hybrid electric vehicle according to an exemplary embodiment of the present disclosure may include determining starting of an engine, in response to determining that a DC-DC converter having an output voltage corresponding to the driving voltage of a starter has failed, operating an engine clutch, disposed between the engine and a driving motor, to enter a slip state, and compensating for a load for starting of the engine using the torque of the driving motor while the engine clutch is operated in the slip state.

In addition, a method of controlling a hybrid electric vehicle according to an exemplary embodiment of the present disclosure may include determining starting of an engine, in response to determining that a DC-DC converter having an output voltage corresponding to the driving voltage of a starter has failed, operating a clutch of a transmission to enter a slip state, increasing the speed of a driving motor to secure kinetic energy for cranking of the engine while the clutch is operated in the slip state, and engaging an engine clutch, disposed between the engine and the driving motor, to perform the cranking.

Further, a hybrid electric vehicle according to an exemplary embodiment of the present disclosure may include an engine, a driving motor, an engine clutch disposed between the engine and the driving motor, and a controller configured to determine starting of the engine, operate the engine clutch to enter a slip state in response to detecting that a DC-DC converter having an output voltage corresponding to the driving voltage of a starter has failed, and to compensate for a load for starting of the engine using the torque of the driving motor while the engine clutch is operated in the slip state.

Additionally, a hybrid electric vehicle according to an exemplary embodiment of the present disclosure may include an engine, a driving motor, an engine clutch disposed between the engine and the driving motor, a transmission disposed on an output side of the driving motor, and a controller configured to determine starting of the engine, operate a clutch of the transmission to enter a slip state in response to detecting that a DC-DC converter having an output voltage corresponding to the driving voltage of a starter has failed, the controller is configured to increase the speed of the driving motor to secure kinetic energy for cranking of the engine while the clutch of the transmission is operated in the slip state, and to engage the engine clutch to perform the cranking when the kinetic energy is secured.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily carry out the exemplary embodiments. The present disclosure may, however, be embodied in many different forms, and should not be construed as being limited to the exemplary embodiments set forth herein. In the drawings, parts irrelevant to the description of the present disclosure will be omitted for clarity. Like reference numerals refer to like elements throughout the specification. The same reference numerals used throughout the specification refer to the same constituent elements.

Figure 2:
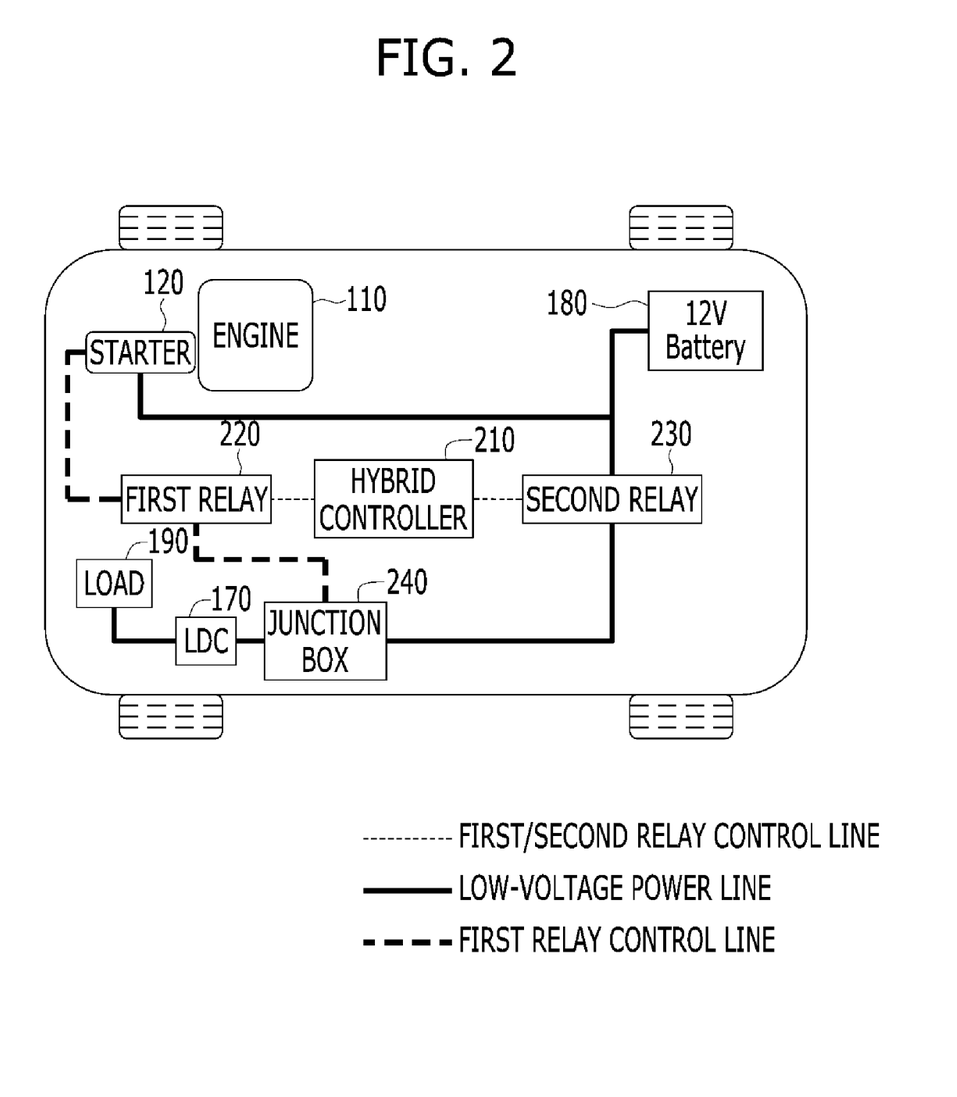
FIG. 2 shows an example of the structure of a hybrid electric vehicle that is applicable to exemplary embodiments of the present disclosure.

FIG. 2 shows an example of the structure of a hybrid electric vehicle that is applicable to exemplary embodiments of the present disclosure. The structure of the hybrid electric vehicle shown in FIG. 2 mainly shows the power system related to the exemplary embodiments, and it is needless to say that an actual hybrid electric vehicle may include a greater number of components. For example, although not shown in FIG. 2, the hybrid electric vehicle may further include an engine management system (EMS) configured to operate an engine 110, a driving motor, a motor control unit (MCU) configured to operate the driving motor, an engine clutch, and a clutch control unit configured to operate the engine clutch. The basic configuration of a powertrain thereof is similar to that shown in FIG. 1. Therefore, differences from the configuration shown in FIG. 1 will be mainly described.

Referring to FIG. 2, the hybrid electric vehicle that is applicable to the exemplary embodiments may include a first relay 220 and a second relay 230, which are connected to a hybrid controller 210 via control lines and are turned on/off under the operate of the hybrid controller 210. The hybrid controller 210 is an upper-level controller, configured to individually operate the components of the powertrain, including the engine management system (not shown), the motor control unit (not shown), and the clutch control unit (not shown). The hybrid controller 210 may be configured to perform determinations necessary for overall control of the powertrain, such as switching of the driving mode and distribution of torque to the driving sources.

A junction box 240 may be disposed between each of the first relay 220 and the second relay 230 and an LDC 170. The junction box 240 may function to selectively supply power to low-voltage power lines according to the state of the power (KEY OFF, ACC, HEV Ready, B+, etc.), and may be implemented in the form of a smart junction box (SJB), without being limited thereto.

Although the first relay 220 is illustrated in FIG. 2 as being provided separately from a starter 120, this is for better understanding of the exemplary embodiment. The first relay 220 may be disposed inside the starter 120. The first relay 220 may be configured to operate the starter 120. The second relay 230 may be configured to isolate a power line between a 12V battery 180 and the starter 120 from a power line between the junction box 240 and a load 190 in the off state (i.e. the open state) thereof.

According to an exemplary embodiment, the first relay 220 and the second relay 230 may be operate by the hybrid controller 210 in a signal inversion manner (i.e. operated such that, when one of the first and second relays is turned on, the other one thereof is turned off). For example, upon engine cranking, the first relay 220 may be turned on (i.e. closed), and the second relay 230 may be turned off, with the result that, even when voltage decrease occurs in the 12V battery 180 due to consumption of electric charge by the starter 120, the load 190 may not be affected by the voltage decrease in the battery 180 due to the off state of the second relay 230, and may be configured to stably receive power from the LDC 170.

However, when the first relay 220 and the second relay 230 are operated in a signal inversion manner at all times, it is difficult to respond to failure of the LDC 170. In other words, as described above, when the first relay 220 is turned on and the second relay 230 is turned off to perform engine cranking, the load 190 is disconnected from the 12V battery 180 due to the off state of the second relay 230, and is not capable of receiving power from the LDC 170. Accordingly, the load 190 may be turned off at the time of cranking operation, and thus the system may shut down (i.e. all of the controllers and the control elements connected to the 12V electric lines may stop operating).

Therefore, it is preferable to individually operate the first relay 220 and the second relay 230 according to the exemplary embodiment. Accordingly, it is preferable for the hybrid controller 210 to include at least two pairs of relay control pins. In addition, the 12V starter 120 may be directly connected to the 12V battery 180, and the 12V battery 180 may be connected to the LDC 170 via the second relay 230 to be charged. Thus, it will be appreciated that the starter 120 of the hybrid electric vehicle according to the exemplary embodiment has a driving voltage corresponding to the output voltage of the LDC 170.

Figure 3A:
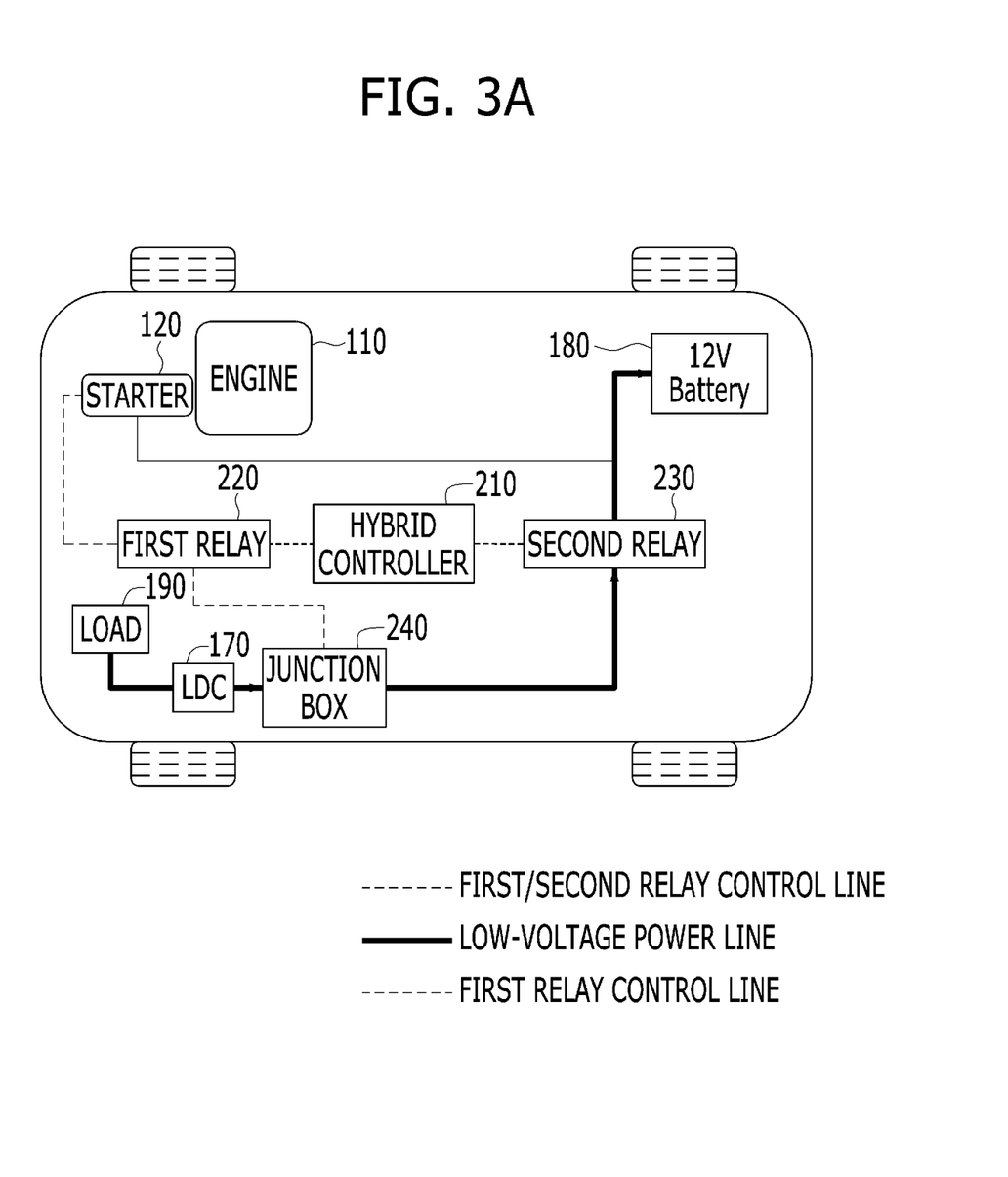
FIG. 3A is a diagram for explaining the direction of current flow in the situation in which the driving mode is maintained in a hybrid electric vehicle according to an exemplary embodiment of the present disclosure.
Figure 3B:
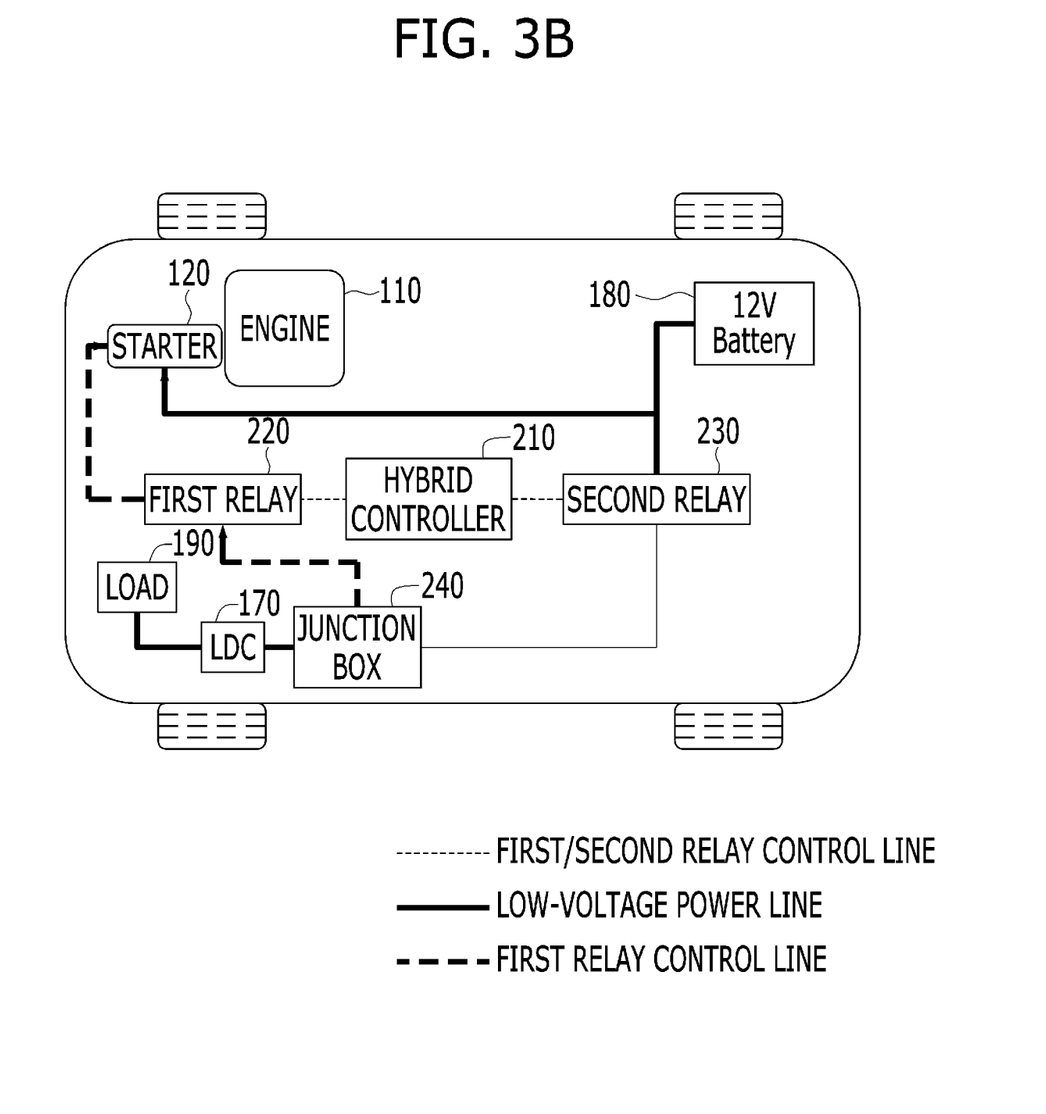
FIG. 3B is a diagram for explaining the direction of current flow in an engine-cranking situation in a hybrid electric vehicle according to an exemplary embodiment of the present disclosure.

Hereinafter, the direction of current flow according to the states of the relays in respective situations in the configuration of the vehicle shown in FIG. 2 will be described with reference to FIGS. 3A and 3B. FIG. 3A is a diagram for explaining the direction of current flow in the situation in which the driving mode is maintained in the hybrid electric vehicle according to an exemplary embodiment of the present disclosure.

Referring to FIG. 3A, in the situation in which the EV mode or the HEV mode is maintained, the first relay 220 may be turned off, and the second relay 230 is may be turned on. Accordingly, the 12V battery 180 may be charged through control of the variable voltage of the LDC 170 according to the state of charge (SOC) of the 12V battery 180. FIG. 3B is a diagram for explaining the direction of current flow in the engine-cranking situation in the hybrid electric vehicle according to an exemplary embodiment of the present disclosure.

Unlike the situation shown in FIG. 3A, in the situation in which the EV mode transitions to the HEV mode, i.e. upon the engine cranking operation, the hybrid controller 210 may be configured to turn on the first relay 220 and turn off the second relay 230. When the engine 110 is started, the hybrid controller 210 may be configured to turn off the first relay 220 again. When the voltage of the 12V battery 180, which has decreased due to consumption of electric charge attributable to engine cranking, recovers, the hybrid controller 210 may be configured to turn on the second relay 230. The reason for this is to prevent deterioration in the durability of the second relay 230 and a voltage decrease in the electric lines due to the voltage difference between the electric line connecting the load 190 to the LDC 170 and the 12V battery 180, which may occur when the second relay 230 is turned on before the voltage of the 12V battery 180, which has decreased (e.g. to about 6 V) due to the use of current of 500 A or greater by the starter 120, as described above, recovers.

Figure 4:
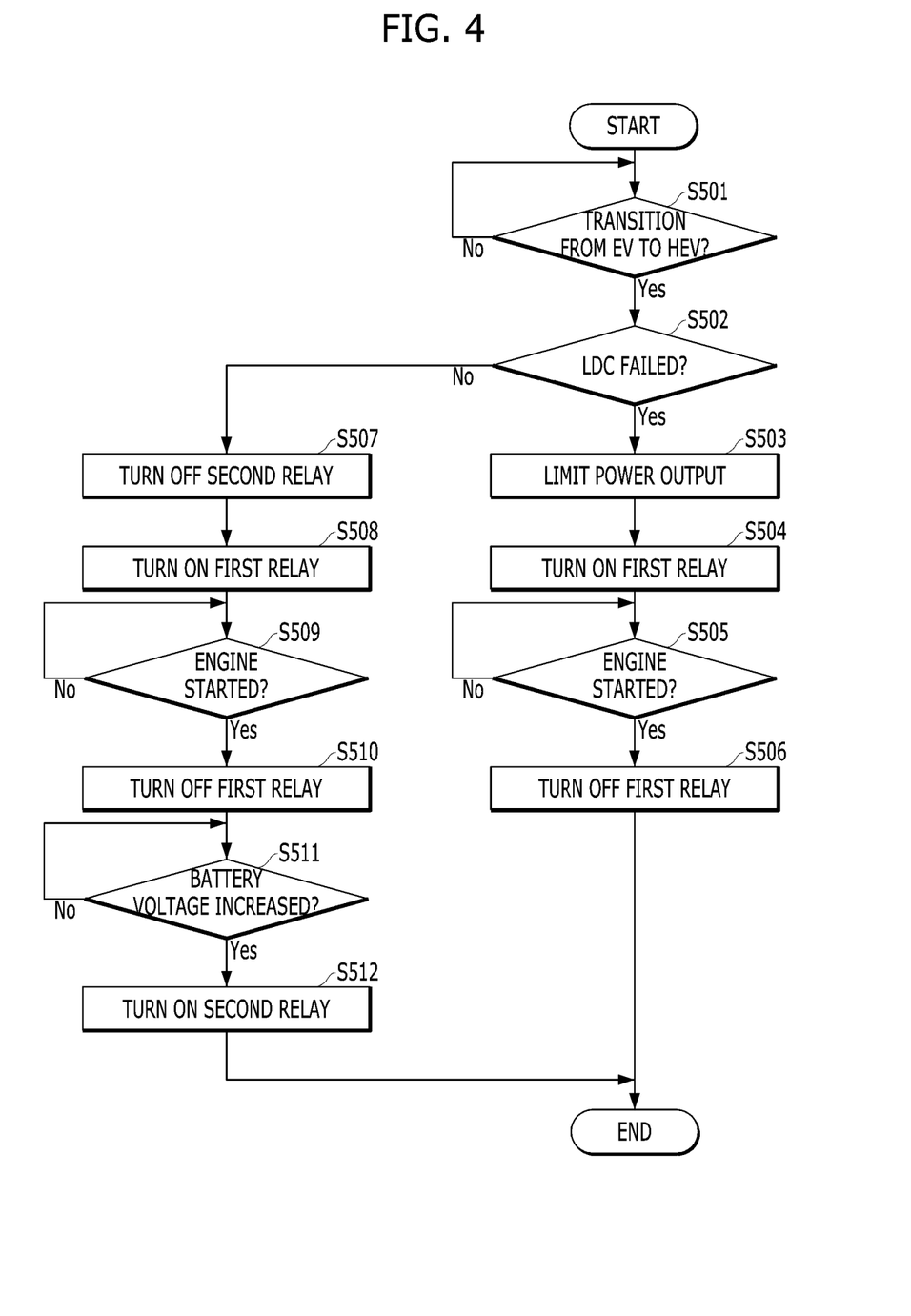
FIG. 4 shows an example of the process in which engine cranking is performed in a hybrid electric vehicle according to an exemplary embodiment of the present disclosure.

Hereinafter, a control process for implementing engine cranking according to an exemplary embodiment in the event of failure of the LDC will be described with reference to FIGS. 4 to 7. FIG. 4 shows an example of the process in which engine cranking is performed in a hybrid electric vehicle according to an exemplary embodiment of the present disclosure.

Referring to FIG. 4, the hybrid controller 210 may be configured to determine whether the transition from the EV mode to the HEV mode is to be performed (S501). In response to determining that the transition is to be performed (Yes in S501), the hybrid controller 210 may be configured to determine whether the LDC has failed (S502). In response to determining that the LDC 170 has failed (Yes in S502), if the second relay 230 is turned off and the first relay 220 is turned on to perform engine cranking, as described above, there may occur the fatal situation in which all of the control systems of the vehicle are turned off during travel of the vehicle because power is not supplied thereto from the 12V electric line.

Of course, when the LDC 170 fails in the state in which the engine 110 has already been started, the driver may drive the vehicle to a destination such as, for example, a repair shop in the on state of the engine. When the LDC 170 fails in the EV mode, the vehicle may be driven in a limp-home mode in consideration of the SOC of the main battery. However, there is also a need for a method of stably performing cranking in the EV mode regardless of the SOC of the battery. Therefore, in this exemplary embodiment, to minimize a reduction in the SOC in preparation for failure of the engine, the output of power from the motor 140 may be limited first (S503). However, this step may be omitted depending on settings.

The hybrid controller 210 may be configured to attempt engine cranking by turning on only the first relay 220 without turning off the second relay 230 to prevent shutdown of the system (S504). At this time, some controllers may be temporarily reset due to a voltage decrease in the 12V electric line. Therefore, the hybrid controller 210 may be configured to notify the driver in advance of this situation through an output device such as a cluster or a display of a head unit to prevent the driver from being inconvenienced. When the engine is started successfully (Yes in S505), the hybrid controller 210 may be configured to turn off the first relay (S506).

On the other hand, when the LDC 170 has not failed (No in S502), the hybrid controller 210 may be configured to turn off the second relay 230 (S507), and turn on the first relay 220 (S508) to attempt engine cranking (S509). When the engine is started (Yes in S509), the hybrid controller 210 may be configured to turn off the first relay 220 (S510), and turn on the second relay 230 (S512) when the voltage of the 12V battery 180 recovers (Yes in S511).

Hereinafter, for convenience of description, control for performing engine cranking in the situation in which the LDC 170 does not fail (i.e. steps S507 to S512) will be referred to as "default start-up control". In addition to a method of attempting engine cranking without turning off the second relay 230, it may also be possible to implement a method of securing kinetic energy for engine cranking in the driving motor 140 through control of slip of the clutch. When the transmission 150 is a general automatic transmission (AT), the slip of the engine clutch 130 may be controlled, and when the transmission 150 is a dual-clutch transmission (DCT), the slip of the transmission clutch may be controlled.

Figure 5:
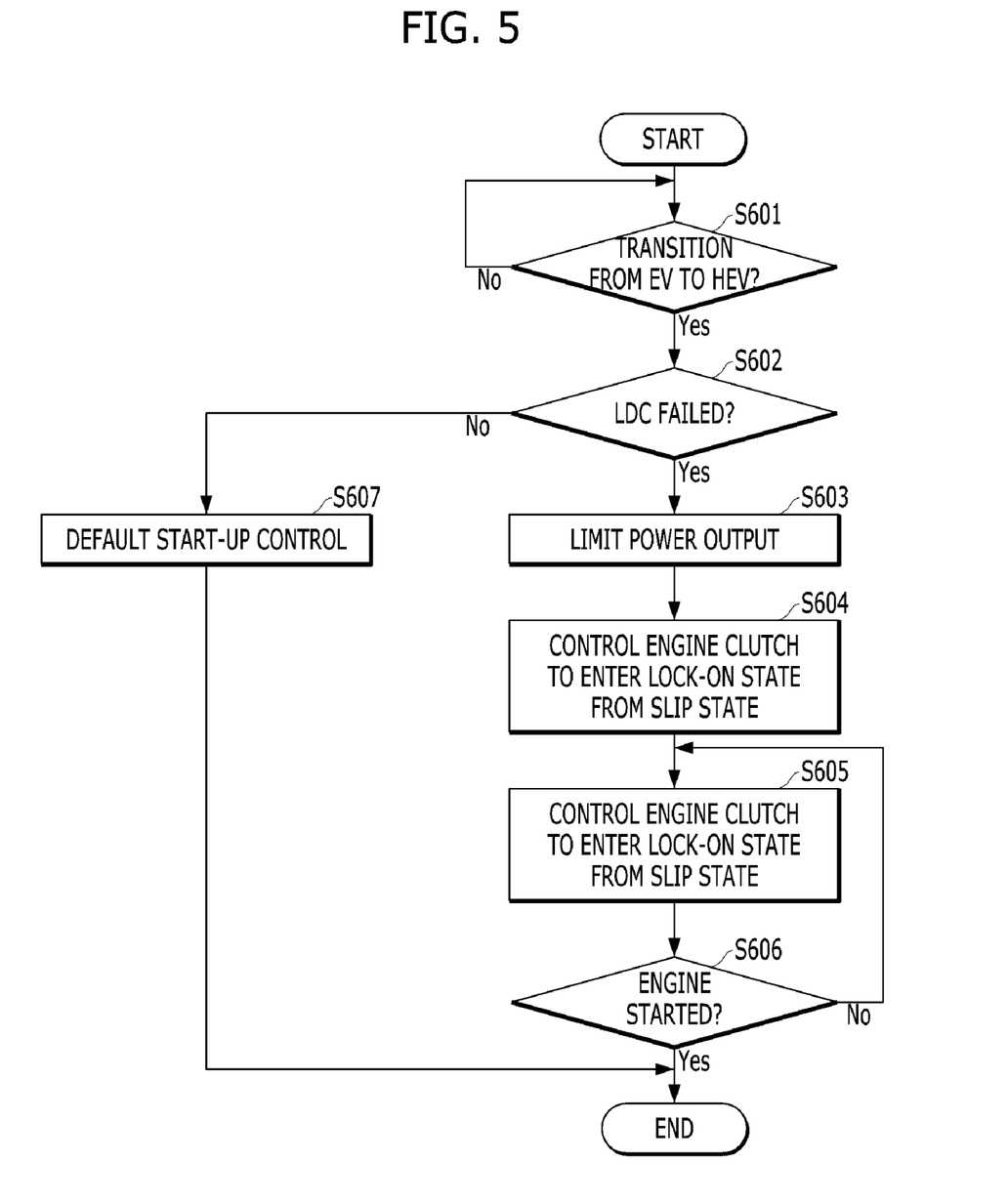
FIG. 5 shows another example of the process of performing engine cranking in a hybrid electric vehicle according to an exemplary embodiment of the present disclosure.

First, cranking control when the transmission 150 is an automatic transmission will be described with reference to FIG. 5. FIG. 5 shows another example of the process of performing engine cranking in a hybrid electric vehicle according to an exemplary embodiment of the present disclosure. Referring to FIG. 5, the hybrid controller 210 may be configured to determine whether the transition from the EV mode to the HEV mode is to be performed (S601). In response to determining that the transition is to be performed (Yes in S601), the hybrid controller 210 may be configured to determine whether the LDC has failed (S602).

Since it is difficult to secure kinetic energy by increasing the speed of the driving motor 140 using a slip element in the transmission 150, in response to determining that the LDC 170 has failed (Yes in S602), it is required to maximally compensate for the transfer torque of the engine clutch 130, which is used as a load for engine cranking, using the driving motor 140 while operating the engine clutch 130 to enter a slip state to prevent the driver from feeling discomfort at the time of engine cranking.

Accordingly, the hybrid controller 210 may be configured to enter a limp-home mode to limit the vehicle-driving torque such that only a part of the available output of the driving motor 140 is used to drive the vehicle (S603). In addition to the limitation in the output of the power, the hybrid controller 210 may be configured to increase the speed (rpm) of the engine while increasing the hydraulic pressure of the engine clutch 130 (S604). At this time, the hybrid controller 210 may be configured to perform control such that the torque consumed to increase the speed of the engine is maximally compensated for by the driving motor 140 to maintain the transfer torque of the engine clutch 130 and thus prevent a reduction in acceleration (S605), and attempts engine cranking (S606).

Figure 6:
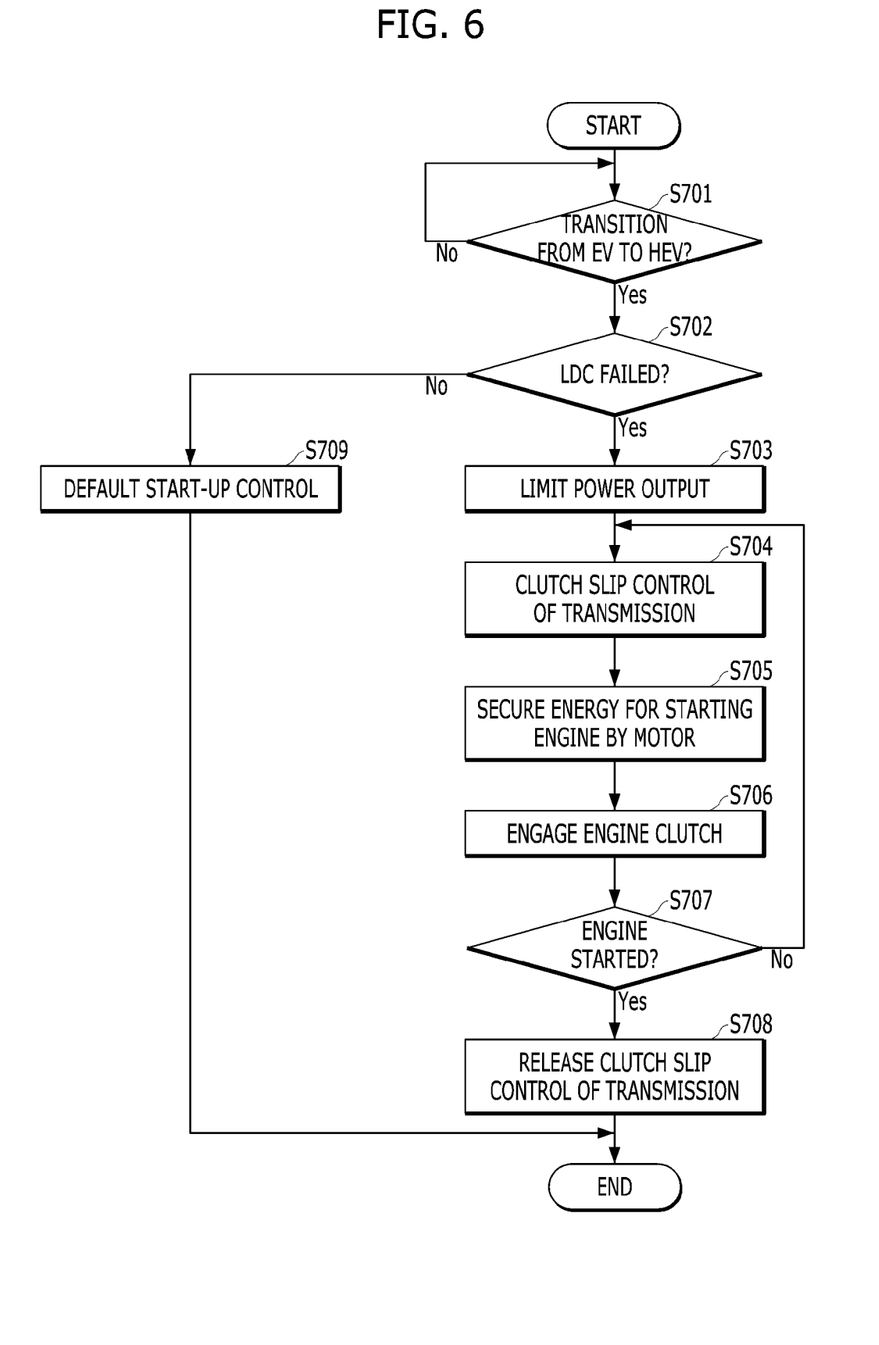
FIG. 6 shows still another example of the process of performing engine cranking in a hybrid electric vehicle according to an exemplary embodiment of the present disclosure.

When the LDC has not failed (No in S602), the default start-up control described above may be performed (S607). Cranking control when the transmission 150 is a dual-clutch transmission (DCT) will be described with reference to FIGS. 6 and 7. FIG. 6 shows still another example of the process of performing engine cranking in a hybrid electric vehicle according to an exemplary embodiment of the present disclosure.

When the transmission 150 is a dual-clutch transmission, it may be possible to secure kinetic energy by operating the clutch on the input side of the transmission to enter a slip state to increase the speed of the driving motor 140. Using these characteristics of the system, in response to determining the transition from the EV mode to the HEV mode (S701) and detecting failure of the LDC 170 (Yes in S702), the hybrid controller 210 may be configured to limit the output of power from the driving motor 140 to secure power for engine cranking (S703).

In addition, the hybrid controller 210 may be configured to operate the clutch on the input side of the transmission to enter a slip state (S704) to transmit a portion of the torque of the driving motor 140 to the driving shaft and use the remaining portion of the torque to increase the speed of the driving motor 140 to secure kinetic energy for starting the engine (S705). Subsequently, the hybrid controller 210 may be configured to engage the engine clutch 130 (S706) and perform engine start control (S707). At this time, since kinetic energy for starting the engine is secured in the driving motor 140, it may be possible to minimize variation in the acceleration attributable to engine cranking during travel of the vehicle. When the engine is started (Yes in S707), the hybrid controller may be configured to release the clutch slip control of the transmission 150 (S708).

When the LDC has not failed (No in S702), the default start-up control described above may be performed (S709). The engine cranking control using slip of the clutch of the transmission described above with reference to FIG. 6 will be described based on the operation of components of the powertrain with reference to FIG. 7.

Figure 7:
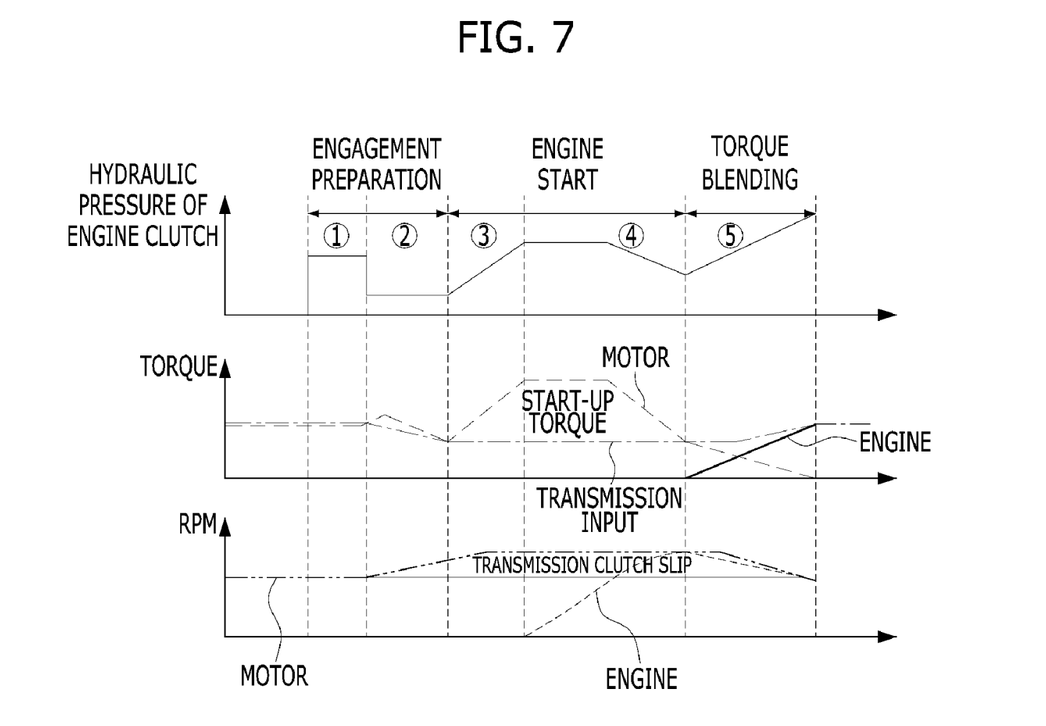
FIG. 7 shows an example of the operation of a powertrain during an engine-cranking process when a DC-DC converter has failed in a hybrid electric vehicle according to an exemplary embodiment of the present disclosure.

FIG. 7 shows an example of the operation of the powertrain during an engine-cranking process when the DC-DC converter has failed in a hybrid electric vehicle according to an exemplary embodiment of the present disclosure. Referring to FIG. 7, in the process of preparing for engagement, the engine clutch 130 checks a touch point through application of hydraulic pressure (①) and maintains a standby state (②). At this time, the driving motor 140 starts to secure kinetic energy through an increase in the speed thereof, and the clutch of the transmission is operated to enter a slip state, whereby the speed of the driving shaft is maintained.

At the beginning (③) of the engine-starting process, the engine clutch 130 may be operated to enter a slip state when hydraulic pressure is increased beyond a kiss point. Accordingly, the driving motor 140 increases in torque and speed to secure kinetic energy, thereby maintaining the transfer torque. At the end (④) of the engine-starting process, the speed of the engine increases through the engagement of the engine clutch, and engine cranking may be performed. After completion (⑤) of the engine-starting process, the torque of the motor is reduced in response to an increase in the torque of the engine through torque blending, thereby satisfying demand torque. In addition, upon completion of engine startup, slip control of the clutch of the transmission may be released.

The present disclosure may be implemented as code that may be written on a non-transitory computer-readable recording medium and thus read by a computer system. The non-transitory computer-readable recording medium includes all types of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a hybrid electric vehicle according to at least one exemplary embodiment of the present disclosure configured as described above may realize engine cranking more stably even when a low-voltage starter is applied thereto. In particular, a hybrid electric vehicle according to the present disclosure may realize engine cranking through control of an engine or a clutch of a transmission and relay control even when a DC-DC converter fails.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of controlling a hybrid electric vehicle, comprising:
   determining, by a controller, starting of an engine;
   in response to detecting that a DC-DC converter having an output voltage corresponding to a driving voltage of a starter has failed, operating, by the controller, an engine clutch, disposed between the engine and a driving motor, to enter a slip state; and
   compensating for a load for starting of the engine using a torque of the driving motor while the engine clutch is operated in the slip state.

2. The method according to claim 1, further comprising:
   in response to detecting that the DC-DC converter has failed, limiting, by the controller, an output of a power from the driving motor,
   wherein the compensating for the load is performed while the output of the power is limited.

3. The method according to claim 2, wherein the compensating for the load is performed to make a transfer torque of the engine clutch constant.

4. A non-transitory computer-readable recoding medium containing a program for performing a method of controlling a hybrid electric vehicle according to claim 1.

5. A method of controlling a hybrid electric vehicle, comprising:
   determining, by a controller, starting of an engine;
   in response to detecting that a DC-DC converter having an output voltage corresponding to a driving voltage of a starter has failed, operating, by the controller, a clutch of a transmission to enter a slip state;
   increasing, by the controller, a speed of a driving motor to secure kinetic energy for cranking of the engine while the clutch is operated in the slip state; and
   engaging an engine clutch, disposed between the engine and the driving motor, to perform the cranking.

6. The method according to claim 5, further comprising:
   when the engine is started, releasing the slip state,
   wherein the transmission includes a dual-clutch transmission (DCT).

7. A hybrid electric vehicle, comprising:
   an engine;
   a driving motor;
   an engine clutch disposed between the engine and the driving motor; and
   a controller configured to determine starting of the engine, to operate the engine clutch to enter a slip state upon detecting that a direct current-direct current (DC-DC) converter having an output voltage corresponding to a driving voltage of a starter has failed, and to compensate for a load for starting of the engine using a torque of the driving motor while the engine clutch is operated in the slip state.

8. The hybrid electric vehicle according to claim 7, wherein, in response to detecting that the DC-DC converter has failed, the controller is configured to limit an output of a power from the driving motor and compensate for the load while limiting the output of the power.

9. The hybrid electric vehicle according to claim 8, wherein the controller is configured to compensate for the load to make a transfer torque of the engine clutch constant.

10. A hybrid electric vehicle, comprising:
an engine;
a driving motor;
an engine clutch disposed between the engine and the driving motor;
a transmission disposed on an output side of the driving motor; and
a controller configured to determine starting of the engine, to operate a clutch of the transmission to enter a slip state in response to detecting that a direct current-direct current (DC-DC) converter having an output voltage corresponding to a driving voltage of a starter has failed, to increase a speed of the driving motor to secure kinetic energy for cranking of the engine while the clutch of the transmission is operated in the slip state, and to engage the engine clutch to perform the cranking when the kinetic energy is secured.

11. The hybrid electric vehicle according to claim 10, wherein the transmission includes a dual-clutch transmission (DCT), and wherein, when the engine is started, the controller is configured to release the slip state.

\* \* \* \* \*